ADJUSTABLE SPRAY HEAD

Original Filed July 27, 1966 2 Sheets-Sheet 1

INVENTOR

CLYDE V. HINDMAN

BY Mason, Fenwick & Lawrence

ATTORNEYS

ADJUSTABLE SPRAY HEAD

Original Filed July 27, 1966 2 Sheets-Sheet 2

INVENTOR

CLYDE V. HINDMAN

BY Mason, Fenwick & Lawrence
ATTORNEYS

United States Patent Office

Re. 26,889
Reissued May 19, 1970

26,889

ADJUSTABLE SPRAY HEAD

Clyde V. Hindman, 1385 Eastern Ave.,
Morgantown, W. Va. 26505

Original No. 3,402,893, dated Sept. 24, 1968, Ser. No. 568,293, July 27, 1966. Application for reissue Apr. 7, 1969, Ser. No. 824,002
Int. Cl. B05b *15/00*
U.S. Cl. 239—546 4 Claims

Matter enclosed in heavy brackets [ ] appears in the original patent but forms no part of this reissue specification; matter printed in italics indicates the additions made by reissue.

ABSTRACT OF THE DISCLOSURE

A spray head consisting of a shell and a resilient, apertured face plate, which may be separate from, or integral with, the shell. Threaded means are provided for engagement with threads carried by the shell which, when rotated, will cause the face plate to flex and change its contour and thereby vary the angular relationship of the apertures in the face plate to change the water spray pattern.

This invention relates to spray heads, and particularly to spray heads adapted for use as shower heads.

It is common practice to mount a shower head at the end of a downturned water pipe in such manner that the head can be turned in various directions to direct the water spray in desired manner. While this mounting gives considerable control of the spray, and permits it to be directed in different directions at will, there has been no simple way of controlling the spray pattern. In other words, the spray head has a plurality of water outlet openings arranged in predetermined pattern. The size, pattern, and angle of the holes determine the spread of the water cone formed by the water stream emerging from the holes. This pattern is fixed and, while it may vary from one shower spray to another, it cannot be changed in a given head.

The general purpose of the present invention is to provide a spray head which is capable of producing spray cones of different shape by simple adjustment.

A more specific object is the provision of such a spray head having an apertured outlet plate which can be adjusted to various curvatures and so change the angle of the orifices therein, and thereby vary the spread of the water cone sprayed from the head.

Another object of the invention is to provide a spray head having an outlet, or face, place with means connecting it to the head shall to permit adjustment of the plate relative to the shell to increase, or decrease, the curvature of the plate.

A still further object is the provision of a spray head having a face plate which is rotatable relative to the spray head shell with means connecting the plate to the shell to cause curvature change in the plate when the plate is rotated relative to the shell.

Yet another object is to provide a spray head having a flexible face plate which is unitary with the shell and has means to vary the outer diameter of the shell and thereby cause flexing of the face plate to different curvatures.

Other objects of the invention will become apparent from the following description of practical embodiments thereof, when taken in conjunction with the drawings which accompany, and form part of, this specification.

Figure 1:
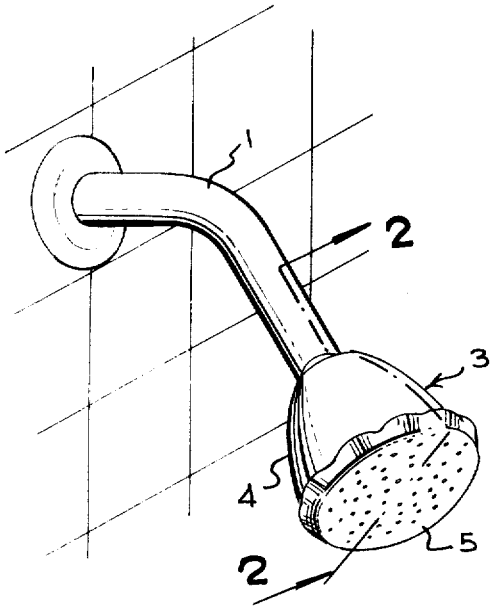
FIG. 1 shows in perspective a shower head constructed in accordance with the present invention mounted on a water pipe.
Figure 2:
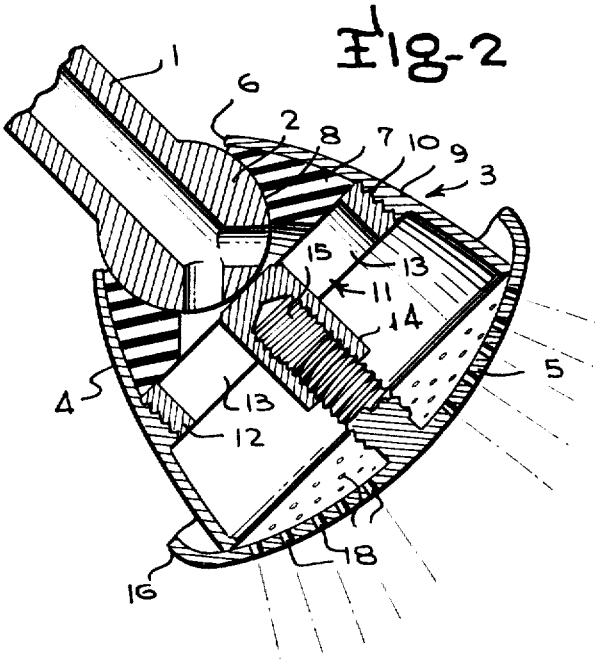
FIG. 2 is a section taken diametrically through the shower head with the face plate adjusted to give a widespread cone spray pattern.
Figure 3:
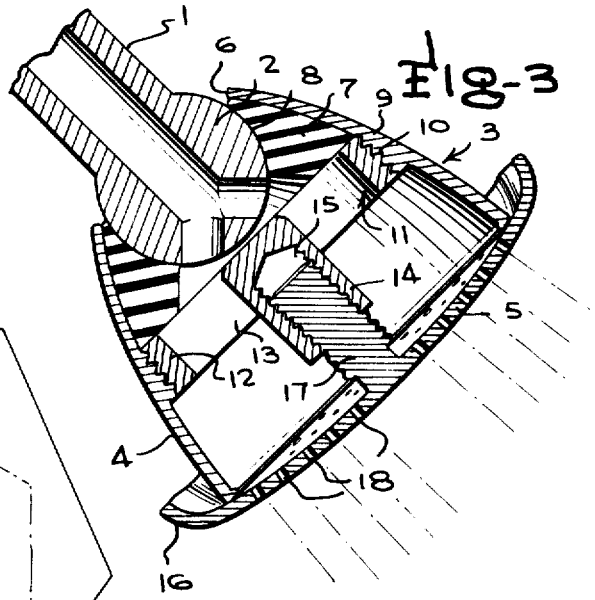
FIG. 3 is a view similar to FIG. 2, but with the face plate adjusted to hold the spray to a less divergent pattern.
Figure 4:
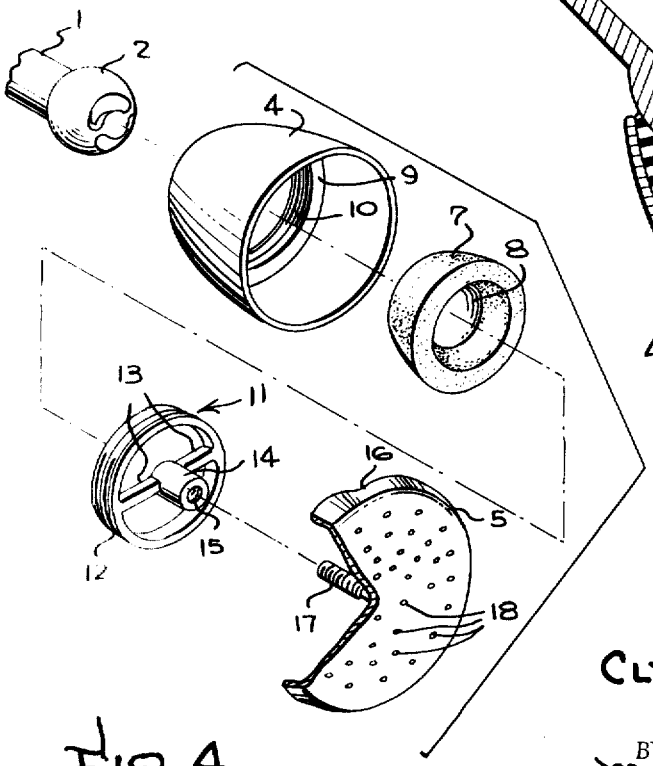
FIG. 4 is an exploded perspective view of the spray head.

In general, the spray head of the present invention includes a shell to which a flexible face plate is connected, with means for adjustment to cause the face plate to change its curvature to produce spray patterns of different shape.

Referring to the drawings in detail and first to that form of the invention shown in FIGS. 1 to 4, there is shown a water pipe 1 having a spherical end 2 to which a spray head 3 is attached for universal movement. The spray head consists, essentially, of a shell 4 and a face plate 5.

The shell 4 is of frusto-conical shape, having its small end open, as at 6, to receive the spherical end 2 of the water pipe. A seal 7, of appropriate outer shape to fit within the smaller end of the shell, and apertured interiorly, as at 8, to receive the spherical head 2 is seated within the small end of the shell. The interior of the shell has an annular ring 9, just above the seal seating area, which is threaded interiorly at 10 to mount a packing ring 11 that is screwed up tight against the seal 7 to force it into sealing relation with the interior of the shell and the spherical end of the water pipe.

Packing ring 11 consists of an outer annulus 12 which is spanned by radial arms 13 supporting a central socket 14. The socket is cylindrical, and has a central, threaded recess 15 extending axially of the ring.

Face plate 5 is a generally circular plate of resilient material of larger circumference than the large, outer open end of the shell and seats upon the shell end. The central portion of the plate, at least that portion spanning the shell end is convexly curved in this form of the invention and the peripheral portion may be turned to form an annular flange 16 surrounding the shell end. The flange may be fluted to make it easy to grasp the plate for adjustment, even though the hands may be wet.

A threaded mounting stud 17 is fixed to the center of the plate 5 and is screwed into the threaded recess 15 of socket 14 on packing ring 11. The face plate is mounted by threading stud 17 into recess 15 and turning the plate until the plate is seated on the shell edge.

Plate 5 is apertured in any desired pattern, but the holes 18 are drilled, or formed, so that their axes are normal to the plate surface. In other words, the holes are radial to the curvature of the plate. Because of this, the holes will maintain their radial relation to the plate under all conditions of flexing of the plate. Consequently, the spray pattern through the holes can be changed by changing the plate curvature. The flatter the plate, the more clearly the holes approach parallelism and the more compact the spray pattern becomes. The greater the curvature of the plate, the more divergent the axes of the holes become, and the wider the spray spread will be.

By having the plate flexible, or resilient, its curvature can be changed by drawing in, or releasing the center of the plate while holding the outer edge in contact with the shell edge. This can be done by screwing stud 17 further into recess 15, or backing it out. The screw is turned by rotating the plate.

When the spray head is in use, the spray pattern can be changed at will simply by turning the face plate. Turning the plate in a clockwise direction will cause the stud 17 to thread into recess 15 and draw the plate center inwardly and reduce the plate contour and thus contract the spray spread. Rotating the face plate in a counter-clockwise direction will back the stud outwardly, and the resiliency of the plate will cause it to increase in curvature. This will spread the spray pattern. The adjustment range has a spray-spreading limit, which is the normal, unflexed condition of the plate, and a spray-concentrating limit which is reached when the plate is substantially flat. Any desirable spray pattern may be set between these limits.

Figure 5:
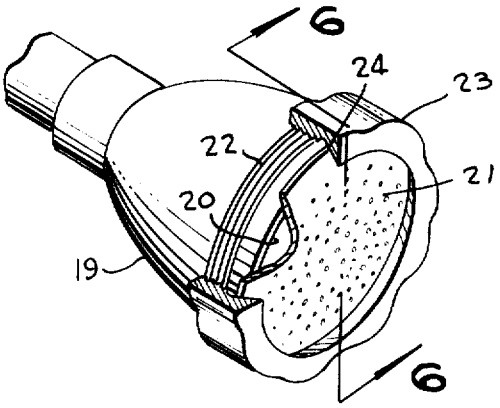
FIG. 5 is a perspective view of a modified form of spray head, parts being broken away for clarity.
Figure 6:
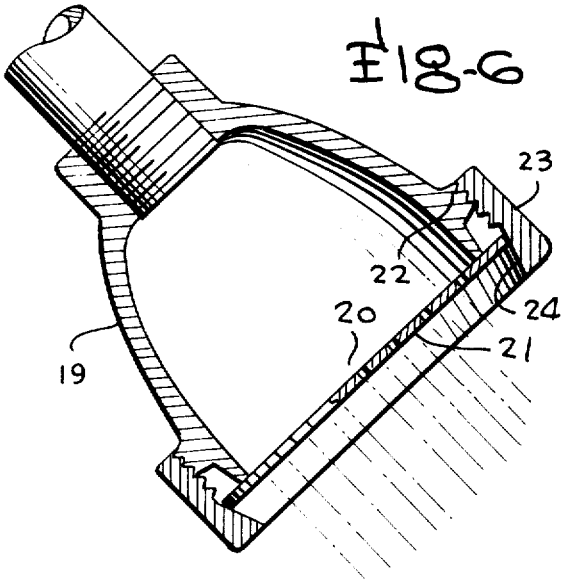
FIG. 6 is a section through the spray head of FIG. 5, and is taken on the line 6—6 of FIG. 5.
Figure 7:
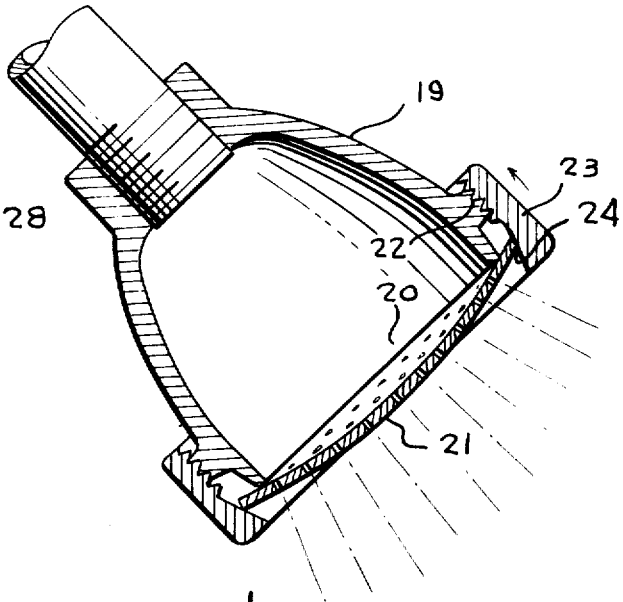
FIG. 7 is a view similar to FIG. 6 with the face plate adjusted to a curved condition.

That form of the invention shown in FIGS. 5 to 7, inclusive, differs somewhat from the one just described. In this modification the shell 19 has an open end 20 that forms an abutment against which the face plate 21 bears. The outer surface of the shell, adjacent the open end, is threaded, as at 22, to receive a threaded adjusting ring 23. The adjusting ring is an annular member, threaded interiorly adjacent one side edge, and having an inwardly sloping cam surface 24 adjacent the other side edge. The ring screws on the shell so that the cam bears against the peripheral edge of the face plate 21 and forces that edge rearwardly and inwardly as the ring is tightened. As the face plate bears upon the shell end inwardly of the face plate edge, the cam pressure will cause the plate to flex and curve (see FIG. 7). The more the ring is threaded onto the shell the greater the curvature of the plate. Of course, as the ring is unscrewed the pressure of the cam against the face plate is lessened and the resiliency of the plate causes the plate to approach its unbiased, flat form (see FIG. 6).

The modification of FIGS. 5 to 7 is reversed to that of FIGS. 1 to 4 in that the face plate of the first form is normally curved and it is flexed toward flat condition, and in the second form the plate is flat in unbiased condition and is flexed to different curvatures.

Figure 8:
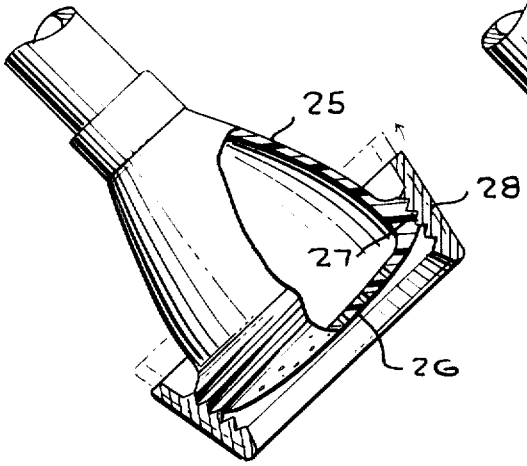
FIG. 8 is an elevational view, with parts in section, of still another spray head structure.

In FIG. 8, there is shown a spray head which has an integral face plate, and the plate and the shell are flexible. The shell 25 is substantially the same shape as those previously described and the face plate 26 has slight curvature in its unflexed condition. The outer surface of the shell is threaded, as at 27, near the juncture of the shell and face plate. A tapered adjusting ring 28 is screwed onto the shell threads, and, because of its tapered shape, will compress the outer end of the shell when the ring is screwed inwardly. This will cause the face plate to flex convexly to increase its curvature. When the ring is backed off of the shell threads, the shell will expand to its previous diameter and the face plate arc will flatten. Here, again, the flexing of the face plate will change its convexity and the shape of the spray emitting therefrom.

It will be noted that in all of the disclosed forms of the invention the water outlet area is substantially unaffected by the changing curvature of the face plate, and there will be no noticeable change in water volume in the spray as the spray pattern is changed. The new spray head will definitely eliminate the needle effect had with adjustment of conventional spray heads.

While in the above practical embodiments of the invention have been disclosed, it will be understood that the specific details of structure shown and described are merely by way of example, and the invention may take other forms within the scope of the appended claims.

What is claimed is:

1. A spray head comprising a shell of resilient material, means to attach one end of the shell to a water pipe, the shell having an opposite end, an apertured face plate of resilient material integral with the shell and spanning the said opposite end of the shell, and means rotatably relative to the shell and movable longitudinally of the shell for flexing the face plate to vary the diametric contour of the face plate and thereby change the angular relationship of the apertures in the face plate.

2. A spray head as claimed in claim 1, wherein the means to vary the contour of the face plate includes threads on the shell adjacent the juncture of the shell and face plate and a threaded ring screwed onto the threads of the shell, the ring having a threaded area which is tapered.

3. A spray head comprising a shell, means to attach one end of the shell to a water pipe, the shell having an opposite end which is an open end, an apertured face plate of resilient material spanning the opposite end of the shell, the face plate being of greater diameter than the open end and resting against the shell at the open end, threads on the exterior of the shell adjacent the open end, a threaded ring screwed onto the shell threads and having means including an inwardly tapering surface to abut the outer edge of the face plate beyond the open end of the shell, whereby rotation of the ring on the shell threads will cause the face plate to flex to vary the diametric contour of the face plate and thereby change the angular relationship of the apertures in the face plate.

*4. A spray head comprising, a shell, means to attach one end of the shell to a water pipe, the shell having an opposite end which is an open end, an apertured face plate of resilient material closing the opposite end of the shell, means including a tapered surface extending longitudinally of the shell and in abutment with the outer edge of the face plate, and means rotatable relative to the shell and movable longitudinally of the shell when rotated to cause relative longitudinal movement between the face plate outer edge and the tapered surface to flex the face plate to vary the diametric contour of the face plate and thereby change the angular relationship of the apertures in the face plate.*

References Cited

The following references, cited by the Examiner, are of record in the patented file of this patent or the original patent.

UNITED STATES PATENTS

| | | | |
|---|---|---|---|
| 3,130,919 | 4/1964 | Baker | 239—546 |
| 3,342,419 | 9/1967 | Weese | 239—546 |

FOREIGN PATENTS

| | | |
|---|---|---|
| 385,537 | 1/1933 | Great Britain. |
| 358,757 | 1/1962 | Switzerland. |

EVERETT W. KIRBY, Primary Examiner

U.S. Cl. X.R.

239—461, 567